July 18, 1939.  A. H. KIRKSEY  2,166,722
TRAILER DUMPING APPARATUS
Filed Jan. 25, 1938  2 Sheets-Sheet 2

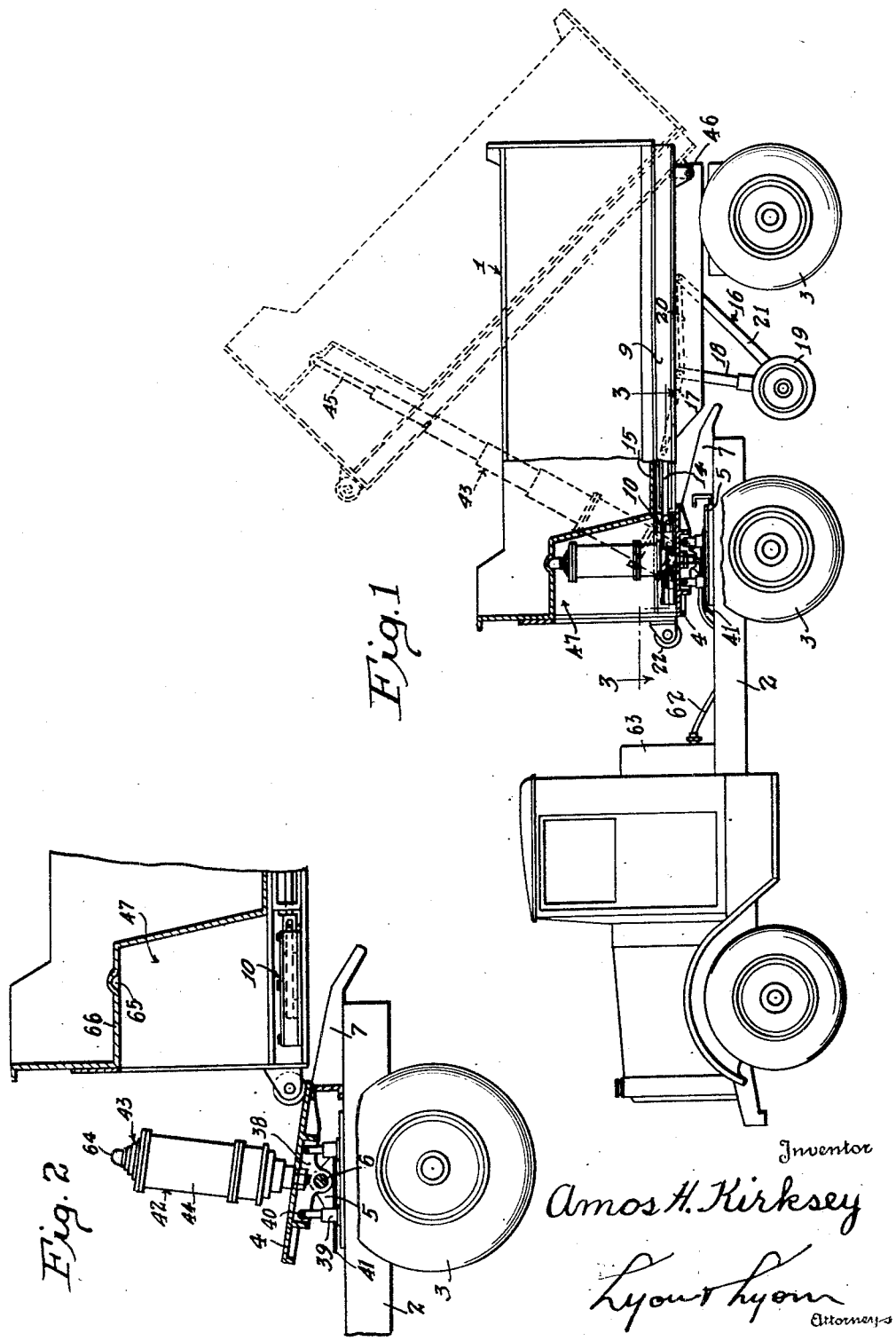

Inventor
Amos H. Kirksey
By Lyon & Lyon
Attorneys

Patented July 18, 1939

2,166,722

UNITED STATES PATENT OFFICE 2,166,722

TRAILER DUMPING APPARATUS

Amos H. Kirksey, Los Angeles, Calif.

Application January 25, 1938, Serial No. 186,839

7 Claims. (Cl. 298—22)

This invention relates to the handling and dumping of loads carried by vehicles, and particularly trailers. It is the usual practice in handling materials such as dirt, or other materials, to carry the same to the place where the material is to be dumped, in trailers, and such trailers are usually provided with a lifting apparatus or hoist of some kind at one end of the trailer that elevates the body at a sufficient angle to dump the material. This necessitates providing a hoist on every trailer, and considerably increases the cost of such trailers. Sometimes the trailers are towed in a train hitched one behind the other, to the place where they are to be dumped, and when they arrive at the point where they are to be dumped they are unhitched and moved individually by the tractor or towing vehicle to the point where the load is to be dumped.

One of the objects of this invention is to provide trailer dumping apparatus, which will enable a tractor or towing car to move a trailer or trailers to the point where they are to be dumped, and then to dump the same, without necessitating the providing of individual hoists on the trailers.

A type of trailer has come into use, having a special construction enabling it to cooperate with a towing car, the rear end of which is backed under the forward end of the trailer, and in this type of apparatus the rear end of the towing car or tractor is provided with a king-pin with which hitching mechanism on the trailer cooperates. One of the objects of this invention is to provide a construction enabling the trailer to be dumped, and which can be readily incorporated with the king-pin of such a towing car or tractor, and which will not interfere with the use of the king-pin in performing its regular function in cooperating with the hitching mechanism to enable the trailer to be towed.

Further objects of the invention will appear hereinafter.

The invention consists in the novel parts and combination of parts to be described hereinafter, all of which contribute to produce an efficient trailer dumping apparatus.

A preferred embodiment of the invention is described in the following specification, while the broad scope of the invention is pointed out in the appended claims.

In the drawings:

Fig. 1 is a side elevation of a towing car and trailer, certain parts being broken away and shown in section. This view shows the car and trailer attached together, and indicates the relation of the hoisting means and the trailer. In dotted lines, this view also illustrates the manner in which the hoist operates to dump the trailer.

Fig. 2 is a vertical section taken at the rear end of the towing car, and illustrates the manner in which the forward end of a trailer of this type is guided onto the rear end of the towing car.

Figure 3:
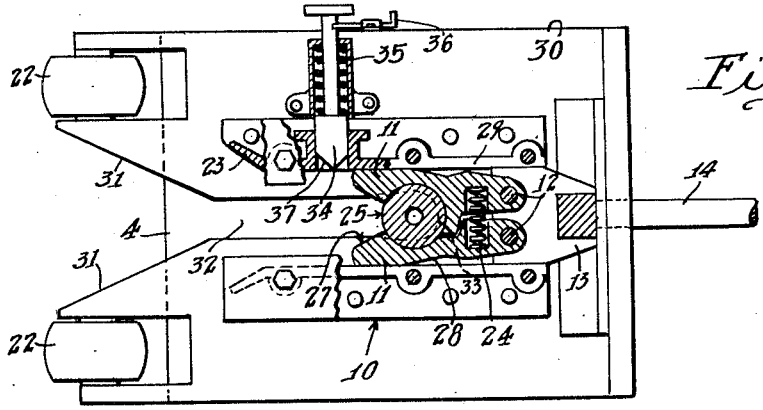
Fig. 3 is a horizontal section taken about on the line 3—3 of Fig. 1, upon an enlarged scale, and showing a hitching mechanism of common type used with such a trailer.

In Figs. 1 and 2, I illustrate a trailer having a body 1, which is capable of cooperating with the tractor or towing car 2, said car being supported at its rear end on rear wheels 3 and having the usual tiltable fifth-wheel plate 4, which is mounted to tilt on a floor bracket 5 on which it is mounted by means of a transverse hinge pin 6. The rear end of the truck or towing car is provided with an inclined guide 7 at each side, and these guides function to guide the forward end of the trailer up onto the tilted fifth-wheel plate 4 when the same is tilted down toward the rear as indicated in Fig. 2.

Figure 4:
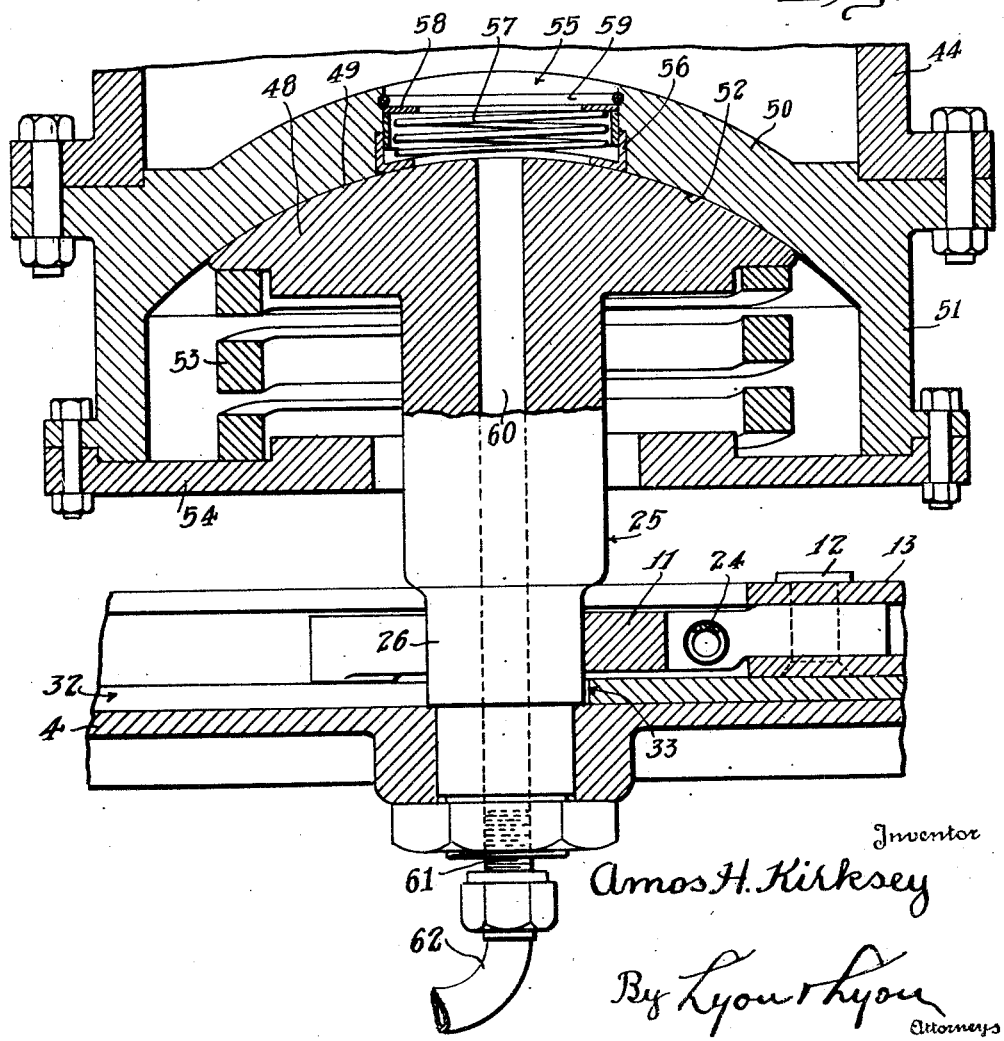
Fig. 4 is a vertical section taken in a front-and-rear plane at the king pin, the king pin being shown partly in elevation; and this view particularly illustrates the means which I may employ for mounting the hoist on the king pin.

The forward end of the frame 9 of the trailer carries a hitching mechanism 10, the assembly of which is illustrated in Fig. 3. This hitching mechanism may be of various kinds, and forms no part of my present invention. The hitching mechanism illustrated comprises a pair of pivoted jaws 11, the rear ends of which are pivotally mounted on pins 12 to a hitching head 13, said hitching head being attached to a plunger 14 that is guided to slide longitudinally under the trailer floor 15. The rear end of this plunger 14 is attached by means not illustrated, to a flexible frame 16 (see Fig. 1) which includes toggle links 17 and 18, and this flexible frame carries dolly wheels 19. The dolly wheel frame includes a rear link 20 and a strut 21. In the operation of this hitching mechanism, when the dolly wheels are down at the ground level they support the forward end of the trailer ready to have the towing car backed under the same, and in this position of the dolly frame and dolly wheels, the plunger 14 carrying the pivoted jaws 11, is disposed in a forwardly projecting position. Such a trailer is provided with guide wheels 22 at its forward end, and when the towing car is backed in under the forward end of the trailer as indicated in Fig. 2, these wheels ride on the side edges of the fifth wheel plate 4 and lift the forward end of the trailer until the wheels 22 pass beyond the vertical plane passing through the axis of the hinge pin 6. When this occurs the plate 4 swings on these hinges down in a horizontal position, as indicated in Fig. 1. When the towing car is backed under the front end of the trailer in this way, the latching jaws 11 are located in a forward position; that is to say, they would be located toward the left in Fig. 3, and beyond throat plates 23 that converge toward each other toward the right, the said jaws 11 being held in an open position by a coil spring 24 located between them. The fifth wheel plate 4 carries a king-pin 25, which is bolted to it in the plane of the axis of the hinge pin 6 when the plate 4 is horizontal, and this king pin has a reduced neck 26. When the towing car backs in, this neck 26 comes against the inclined guide faces 27 at the forward ends of the jaws, and moves them apart so as to enable the neck of the king pin to pass into the space between the jaws, and as the backing movement continues, inclined guide faces 28 on the outer sides of the jaws engage the inclined inner faces of the throat plates 23, and these throat plates 23 press the jaws 11 toward each other and facilitate their passing into their locking position in which they are held between parallel guide plates or flanges 29 on the upper side of the locking plate 30, which is rigidly secured forwardly, and at the underside of the trailer body. This plate 30 at its forward end has a flared guide throat 31 that guides the neck 26 back into a slot 32. In this movement the neck 26 comes to rest at the inner end 33 of this slot (see Fig. 4).

In order to prevent the hitch from unlocking, as might occur if the trailer ran forwardly on the tow car, a locking pin 34 is usually provided. This locking pin is pressed inwardly by a coil spring 35, but may be held in a retracted position by a hand-controlled latch 36 when the towing car is to be uncoupled from the trailer. The forward end of this pin may have an inclined face 37 that can rest against the side of the adjacent jaw 11 before the jaws are moved back between the guide flanges 29 in the coupling movement. If left in this position, this bolt 34 will snap into place automatically. In order to cushion the movements of the fifth wheel plate if desired, soft rubber blocks (not illustrated) may be placed in the space 38 (see Fig. 2) but I prefer to provide a pair of hydraulic dash pots 39 having pistons pivotally connected at 40 to the under side of the fifth wheel plate. These cylinders below the pistons are connected by a tube 41 of small diameter that restricts the flow of the liquid used in the dash pots.

On the upper end of the king pin 25 I mount a cylinder type telescoping hoist 42, which is provided with a plurality of sections 43 of graduated diameter. In other words, the hoist comprises an outer cylinder 44 with a plunger composed of the sections 43. When the towing car has been coupled to the trailer in the manner indicated in Fig. 1, the upper end or uppermost section 45 of the plunger is in a position to engage means on a trailer so that when the plunger is operated, the trailer will be tilted on a rock shaft 46 located near its rear end (see Fig. 1).

In order to provide clearance for the hoist 42, the forward end of the trailer is provided with a pocket 47 to receive the hoist as indicated in Fig. 1. The hoist is mounted on the king pin 25 by means of a joint, so as to permit the hoist to swing through an angle toward the rear when the hoist is operated to dump the material from the trailer body. This joint is illustrated in detail in Fig. 4. It is preferably constructed so as to permit of introducing the operating fluid for the plunger of the hoist through the king pin. In order to accomplish this, the king pin is preferably constructed with an enlarged head 48 having a convex upper face 49. This convex face forms the seat for the bottom head 50 of the cylinder 44 of the hoist, which is preferably formed as a casting of considerably larger diameter than the head 48, and with a downwardly projecting circumferential wall or apron 51. This bottom head 50, of course, has a concave face 52 having the same radius of curvature as the face 49 of the head 48.

Means is provided for resiliently pressing the head 50 down onto its seat 49. For this purpose I prefer to provide a heavy coil spring 53 pressing against the under side of the head 48, and thrusting its lower end against a seat plate 54 that is bolted to the lower edge of the apron 51. The bottom head 50 is provided with an enlarged opening 55 communicating with the interior of the cylinder 44 to insure that communication will be maintained to the interior of the cylinder 44 in any tilted position that the hoist may assume. In this opening 55 a cup leather 56 or similar packing is provided, preferably held in place by a coil spring 57 seating at its outer end against a follower 58. This follower may be held in place by a removable spring 59.

The oil or other liquid used for actuating the plunger, is admitted through a central duct 60 passing up through the king-pin and communicating with the opening 55. The lower end of this duct 60 is provided with a threaded nipple 61 for attaching a hose 62 to lead the oil into the duct. This hose connects at its forward end to a reservoir 63 on the towing car that carries the oil under pressure.

The upper end of the plunger is preferably formed with a rounded nose 64, which is received in a correspondingly formed socket 65 formed in the upper plate or cover plate 66 of the pocket 47.

The mode of operation of the apparatus will now be briefly described. In this connection it should be understood that the use of this hoist on the towing car, enables a single hoist to be used to dump any number of trailers. These trailers can be towed to the job where the material is to be dumped. They can be towed in this way either singly or in a train of connected trailers. If a train of trailers has been towed to the job, they can be uncoupled in succession with sufficient distance between them to permit the towing car to back into position under the forward end of the trailers in succession to dump them. The hoist, of course, is operated to dump the trailer that is coupled to the towing car. In doing this, oil under pressure is admitted through the hose 62 through a valve (not illustrated) which would be controlled from the driver's seat in the towing car. This, of course, extends the plunger of the hoist and elevates the forward end of the trailer body as indicated in dotted lines in Fig. 1.

When the apparatus is being used to dump a trailer not already coupled to the towing car, the towing car is backed under the forward end of the trailer in the manner indicated in Fig. 2. At this time the forward end of the trailer is supported on the dolly wheels 19, the toggle links 17 and 18 being in a substantially "dead-center" position. As the towing car moves rearwardly, the neck 26 passes in through the guide throat of the slot 32, being guided therein by the inclined guide faces 31. The neck of the king pin then passes into the space between the jaws 11, and pushes them rearwardly into the guide space between the guide flanges 29, thereby causing these jaws to engage the neck of the pin in the manner illustrated in Fig. 3. The locking pin 34, the nose of which has been resting against the side of the adjacent jaw 11, then snaps into position in front of the locking jaws. The rearward movement of the jaws 11 also effects a rearward movement of the plunger 14 that is connected to the dolly frame 16, and this lifts the dolly wheels 19 clear of the ground. When the neck 26 arrives at the inner end 33 of the slot 32, the nose 64 of the hoist will be in line with the socket 65, and when the oil under pressure is admitted to the cylinder, the plunger will extend itself and dump the trailer body.

When the towing car is backed under the forward end of the trailer, of course, the rollers or small wheels 22 at the forward end of the trailer ride up on inclined guides 7. Before the towing car is backed in, the fifth wheel plate 4 should be tilted into the position indicated in Fig. 2. This enables the wheels 22 to roll off the guides 7 onto the plate 4, and they continue to roll up on this plate until they pass the plane of the hinge pin 6, whereupon the fifth wheel plate will assume a substantial horizontal position. All rocking movements of the hoist 42 are cushioned by the dash pots 39.

It will be evident that the joint between the hoist cylinder and the king-pin, will permit any necessary lateral movement to bring the nose 64 of the hoist plunger into line with the socket 65.

It is understood that the embodiment of the invention described herein is only one of the many embodiments this invention may take, and I do not wish to be limited in the practice of the invention, nor in the claims, to the particular embodiment set forth.

What I claim is:

1. In a trailer dumping apparatus, the combination of a vehicle having a king-pin mounted at its rear end, a fluid-operated hoist mounted on the upper end of the king-pin, a trailer having means for engaging the king-pin to enable the vehicle to pull the trailer, said trailer having means for engaging the upper end of the plunger of the hoist; and means for admitting a fluid under pressure to the hoist to elevate the forward end of the trailer.

2. In a trailer dumping apparatus, the combination of a vehicle having a king-pin mounted at its rear end, said king-pin having a head at its upper end and a neck below the head for engaging trailer hitching means, a fluid-operated cylinder-type hoist having a bottom head fitting over the head of said king-pin, said bottom head and said king-pin head having curved engaging faces enabling the hoist to be swung through an angle at its upper end, and means for admitting the operating fluid to the hoist through the king-pin and through said heads.

3. In a trailer dumping apparatus, the combination of a vehicle having a king-pin mounted at its rear end, said king-pin having a neck toward its lower end for engaging trailer hitching means, and having an enlarged head at its upper end with a convex curved upper face, a fluid-operated cylinder-type hoist having a bottom-head with a concave curved face seating on the convex face of said head, means for pressing the bottom-head down onto the king-pin head, said bottom-head and king-pin head cooperating to permit the upper end of the hoist to swing through an angle; and means for admitting operating fluid to the interior of the hoist.

4. In a trailer dumping apparatus, the combination of a vehicle having a king-pin mounted at its rear end, said king-pin having an enlarged head at its upper end with a convexly curved upper face, a fluid-operated cylinder-type hoist having a bottom-head with a concave curved face seating on the convex face of said head, a spring under the said head, means secured to the bottom-head below the spring for taking the thrust of the spring to press the bottom head down upon the king-pin head, said bottom-head and king-pin head cooperating to permit the upper end of the hoist to swing through an angle, said king-pin having a fluid-duct passing upwardly through the same and communicating with the interior of the hoist through the bottom-head of the hoist.

5. In a trailer dumping apparatus, the combination of a vehicle, a fifth wheel plate, means for supporting the fifth wheel plate to rotate on a substantially horizontal axis and enabling the same to tilt downwardly at its rear edge and thereby facilitate the movement of the forward end of a trailer up onto the fifth wheel plate, a king-pin mounted on the said plate and extending above the same, and a fluid-operated cylinder-type hoist mounted on the upper end of the king-pin, said king-pin and said hoist having a joint connection therebetween permitting the upper end of the hoist to swing through an angle.

6. In a trailer dumping apparatus, the combination of a vehicle, a fifth-wheel plate to rotate on a substantially horizontal axis and enabling the same to tilt downwardly at its rear edge and thereby facilitate the movement of the forward end of a trailer up onto the fifth-wheel plate, a king-pin mounted on the said plate and extending above the same, a fluid-operated cylinder-type hoist mounted on the upper end of the king-pin, said king-pin and said hoist having a joint connection therebetween permitting the upper end of the hoist to swing through an angle, and a trailer mounted on wheels and having a forward end constructed so as to enable the same to ride up over the said fifth-wheel plate, the forward wall of the trailer having a pocket to receive the said hoist, and means above the pocket for engaging the plunger of the hoist.

7. In a trailer dumping apparatus, the combination of a vehicle, a fifth-wheel plate, means for supporting the fifth wheel plate to rotate on a substantially horizontal axis and enabling the same to tilt downwardly at its rear edge and thereby facilitate the movement of the forward end of a trailer up onto the fifth-wheel plate, a king-pin mounted on the said plate and extending above the same, said king-pin having a reduced neck adjacent the fifth-wheel plate, and having an enlarged head above the neck, said neck capable of cooperating with trailer hitching-mechanism, and a fluid-operated cylinder-type hoist mounted on the upper end of the king-pin, said king-pin and said hoist having a joint connection therebetween permitting the upper end of the hoist to swing through an angle, and a trailer mounted on wheels and having a forward end constructed to enable the same to ride up over the fifth-wheel plate, the forward wall of the trailer having a pocket to receive the hoist with means above the pocket for engaging the plunger of the hoist.

AMOS H. KIRKSEY.